(12) United States Patent
Saito (10) Patent No.: US 6,531,659 B1
(45) Date of Patent: Mar. 11, 2003

(54) SYSTEM FOR HOLDING A HEAT SHRINKABLE TUBE DURING A HEAT SHRINKING OPERATION

(75) Inventor: Takahiro Saito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/570,943

(22) Filed: May 15, 2000

Related U.S. Application Data (62) Division of application No. 09/210,718, filed on Dec. 14, 1998, now Pat. No. 6,090,231.

(30) Foreign Application Priority Data

Dec. 12, 1997 (JP) ............................................. 9-342971

(51) Int. Cl.[7] .......................... H01B 7/02; H01B 13/06; H01B 13/22
(52) U.S. Cl. ........................ 174/168; 174/169; 174/172
(58) Field of Search .............................. 156/47, 48, 84; 269/903, 99, 100, 261; 81/44; 174/168, 169, 172, 154; 227/147

(56) References Cited

U.S. PATENT DOCUMENTS

| | | | |
|---|---|---|---|
| 3,847,193 A | * 11/1974 | Brunstetter | ................. 227/147 |
| 4,504,699 A | 3/1985 | Dones et al. | ................. 174/84 |
| 5,378,855 A | 1/1995 | Delalle | ......................... 174/87 |
| 5,544,552 A | * 8/1996 | Kirsch et al. | ................. 227/147 |
| 5,667,513 A | * 9/1997 | Torrie et al. | ................. 606/104 |

FOREIGN PATENT DOCUMENTS

| | | | |
|---|---|---|---|
| JP | 1-189881 | 7/1989 | ........... H01R/43/00 |
| JP | 8-78066 | 3/1996 | ............ H01R/4/22 |
| JP | 8-88917 | 4/1996 | ............ H02G/1/14 |

* cited by examiner

Primary Examiner—Michael W. Ball
Assistant Examiner—John T. Haran
(74) Attorney, Agent, or Firm—Sughrue Mion, PLLC (57) ABSTRACT

An electric wire-connecting portion (11) is formed by connecting together conductive ends of a plurality of electric wires (W). One end of a heat shrinkable tube (12) is sealed with hot melt adhesive (15). The heat shrinkable tube (12) is attached onto the electric wire-connecting portion (11). A tube holding tool (13) for protecting the one end of the heat shrinkable tube (12) against heat is attached to the one end of the heat shrinkable tube (12). The heat shrinkable tube (12) is heated to shrink thereby sealing the electric wire-connecting portion (11). The tube holding tool (13) includes a holding portion (13a) for holding the one end of the heat shrinkable tube (12), and a shaft portion (13b) integrally formed with the holding portion (13a). A tube shrinking machine (14) includes a heating section (19) for heating the heat shrinkable tube (12), a wire transporting section (17) for transporting a bundled portion of the electric wires (W), and a tool transporting section (18) for transporting the tube holding tool (13).

4 Claims, 7 Drawing Sheets

SYSTEM FOR HOLDING A HEAT SHRINKABLE TUBE DURING A HEAT SHRINKING OPERATION

This is a divisional of application Ser. No. 09/210,718 filed Dec. 14, 1998, now U.S. Pat. No. 6,090,231, the disclosure of which is incorporated herein by reference.

BACKGROUND OF THE INVENTION

1. Field of the Invention

The present invention relates to a method of sealing an electric wire-connecting portion formed by connecting together conductive ends of a plurality of electric wires, in which electric insulation and waterproofing property of the electric wire-connecting portion are secured by covering the electric wire-connecting portion. Furthermore, the present invention also relates to a tool for holding a heat shrinkable tube used in the sealing method, and a tube shrinking machine for heating a heat shrinkable tube covering the electric wire-connecting portion.

The present application is based on Japanese Patent Application No. Hei. 9-342971, which is incorporated herein by reference.

2. Description of the Related Art

An example of a method of protecting an electric wire-connecting portion in which conductive ends of electric wires are bundled and connected to each other, will be described with reference to FIGS. 9 through 11.

Figure 9:
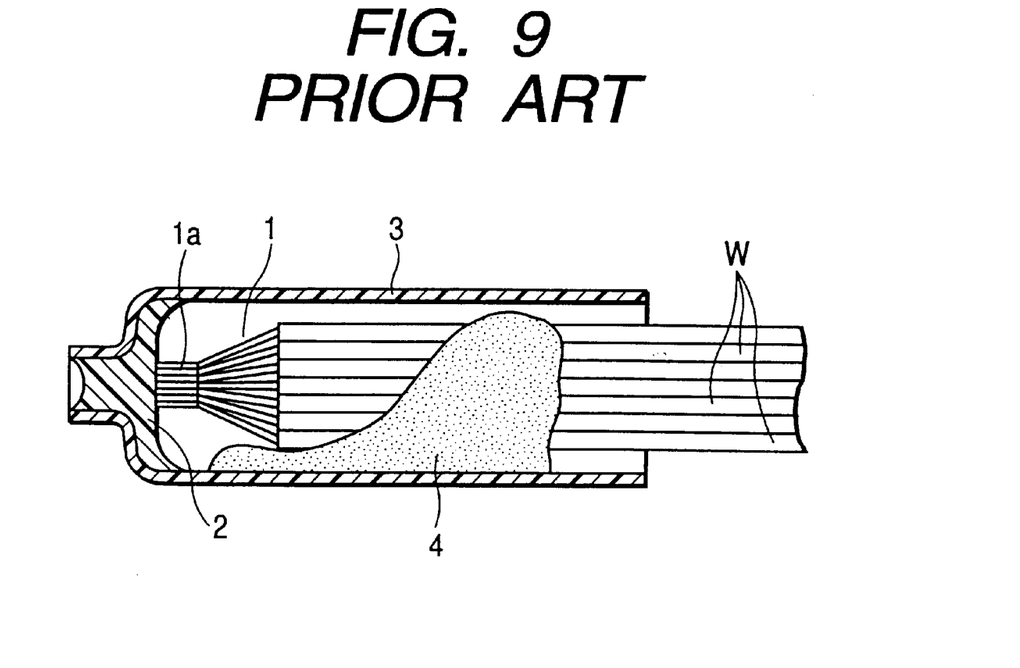
FIG. 9 is a longitudinal sectional view illustrating how to hermetically seal an electric wire-connecting portion for its protection.

In FIG. 9, conductive ends of a plurality of electric wires W are bundled and connected together to form an electric wire-connecting portion 1. The electric wire-connecting portion 1 is subjected to thermal press fitting so that an end portion 1a is formed. Further, the electric wire-connecting portion 1 is subjected to bonding treatment (not shown) in which an adhesive is penetrated into or is applied onto the electric wire-connecting portion 1 so as to secure its waterproofing property.

The electric wire-connecting portion 1 is covered by a heat shrinkable tube 3. One end of the heat shrinkable tube 3 is sealed with a hot melt adhesive 2. Further, the heat shrinkable tube 3 is filled with sealing compound such as butyl rubber.

Figure 10:
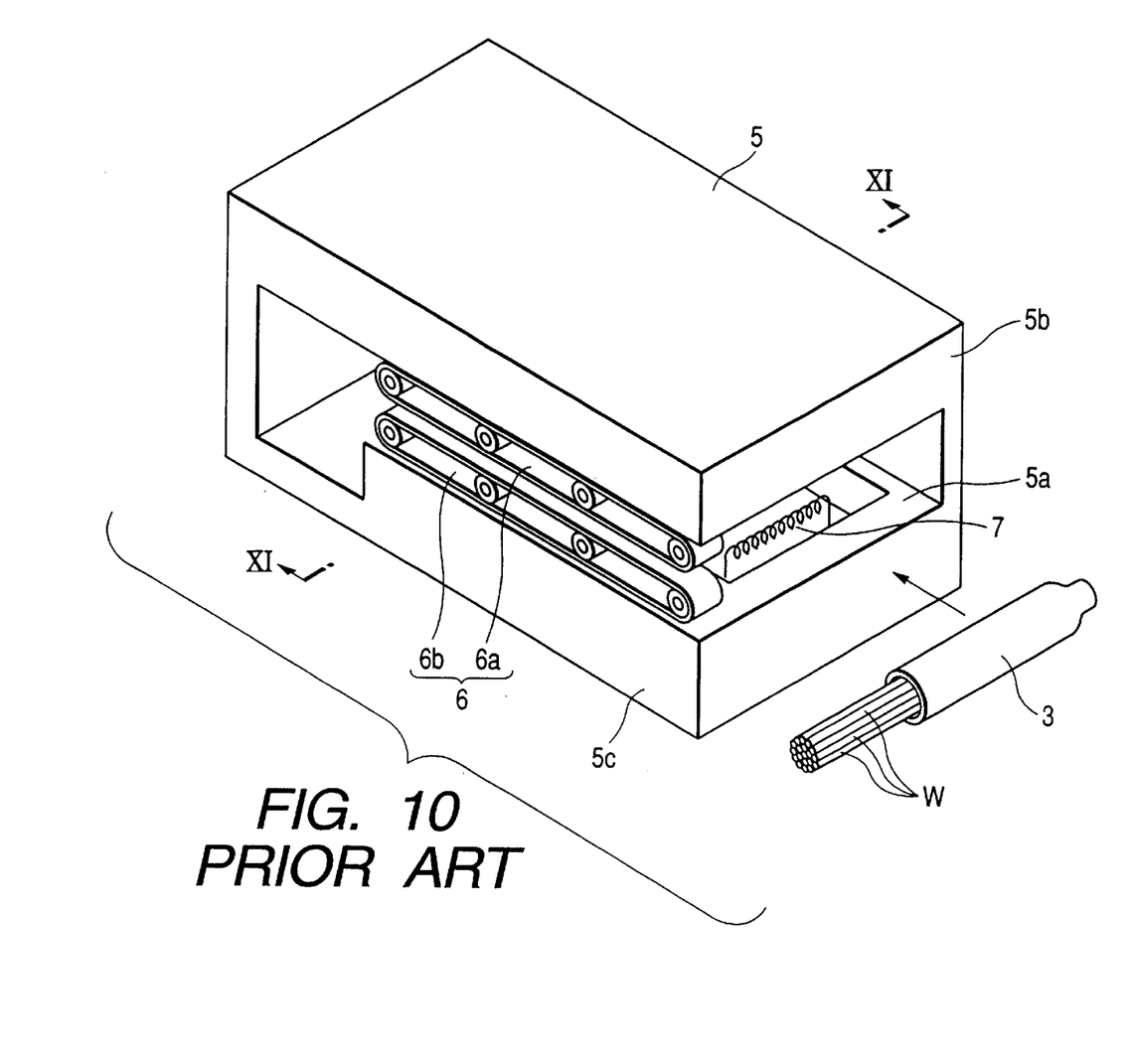
FIG. 10 is a perspective view showing a tube shrinking machine.

The electric wire-connecting portion 1 thus covered with the heat shrinkable tube 3 is inserted into a tube shrinking machine 5 in a direction of an arrow as shown in FIG. 10.

A space 5a is formed in the body of the tube shrinking machine 5. As shown in FIG. 10, the space 5a extends in a slit-like manner over from a front end 5b of the tube shrinking machine 5 to one side 5c of the tube shrinking machine 5. The electric wire-connecting portion 1 covered with the heat shrinkable tube 3 is passed through the space 5a of the tube shrinking machine 5. A wire transporting section 6 includes a pair of an upper transport belt 6a and a lower transport belt 6b, which are disposed in the space 5a at the upper and lower portions adjacent to the one side 5c. The transport belts 6a and 6b transport a bundled portion of the electric wires W while holding it therebetween. The wire transporting section 6 is driven by a motor (not shown).

Figure 11:
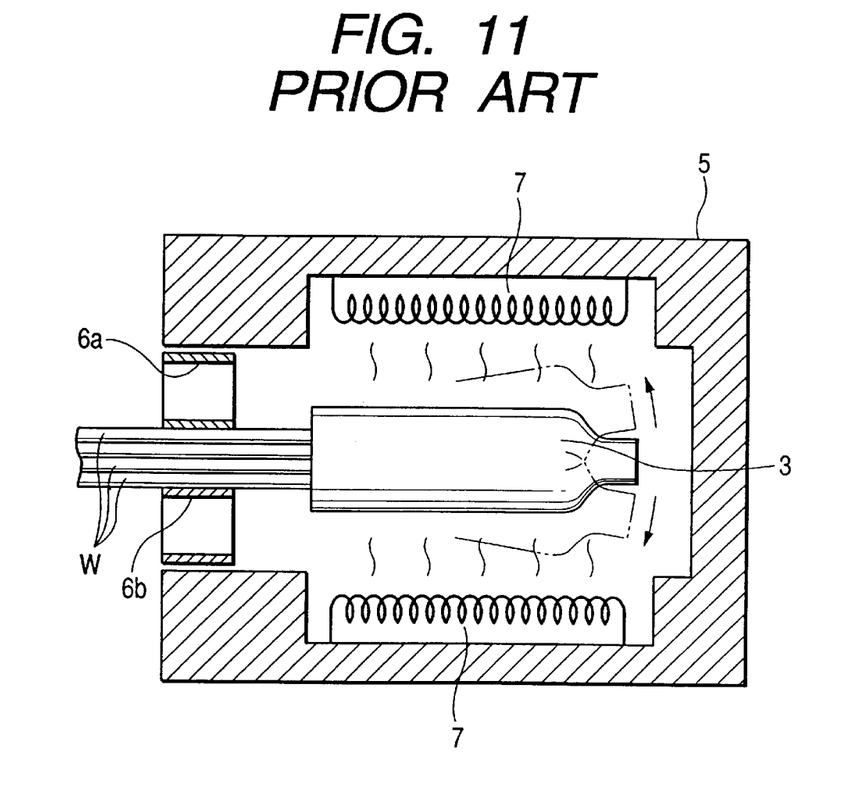
FIG. 11 is a cross sectional view taken along a line XI—XI in FIG. 10.

FIG. 11 is a cross sectional view taken along a line XI—XI in FIG. 10. As shown in FIG. 11, a pair of heaters 7 are disposed inside of the tube shrinking machine 5 to sandwich the space 5a. The heaters 7 are used for heating the heat shrinkable tube 3 so as to shrink. The electric wire-connecting portion 1 with the heat shrinkable tube 3 is inserted into the tube shrinking machine 5, and is transported by the transport belts 6a and 6b while the bundled portion of the electric wires W is held therebetween. During the transportation, the heat shrinkable tube 3 is heated by the heaters 7. In accordance with the heating, the heat shrinkable tube 3 shrinks to hermetically seal the electric wire-connecting portion 1 as shown in FIG. 9. As a result, electrical insulation and waterproofing property of the electric wire-connecting portion 1 are ensured, and the electric wire-connecting portion 1 is taken out of the tube shrinking machine 5.

In the above tube shrinking machine 5, however, when the electric wire-connecting portion 1 is transported while the bundled portion of the electric wires W is held between the transport belts 6a and 6b, the electric wire-connecting portion 1 may vibrate in the arrow directions as shown in FIG. 11. As a result, there is a possibility in that the heat shrinkable tube 3 is disengaged from the electric wire-connecting portion 1.

Further, there is a possibility in that the heat shrinkable tube 3 is brought into contact with the heater 7, and therefore it burns.

Figure 12:
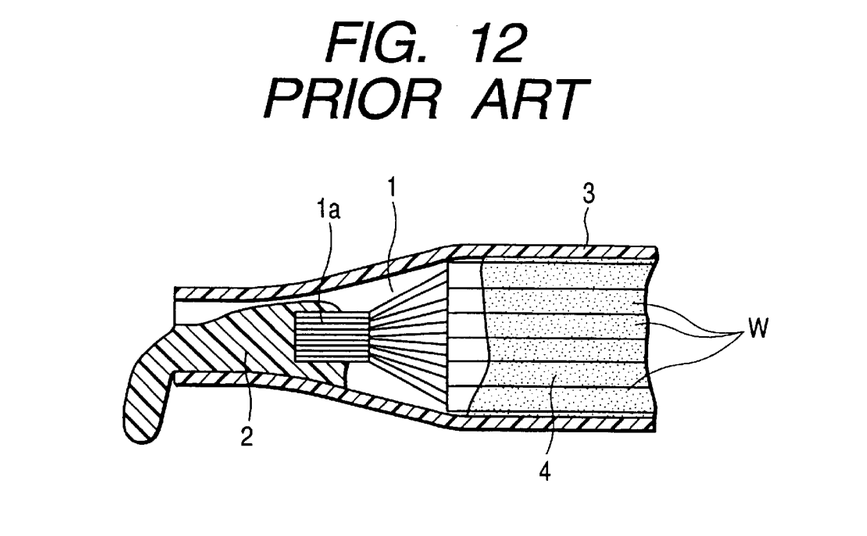
FIG. 12 is a sectional view showing a state in that hot melt adhesive flows out of a heat shrinkable tube for hermetically sealing the electric wire-connecting portion.

Furthermore, when the heat shrinkable tube 3 vibrates and the end of the heat shrinkable tube 3 sealed with the hot melt adhesive 2 is too close to the heaters 7, the hot melt adhesive 2 melts and flows out of the end of the tube as shown in FIG. 12. The result is to destroy the structure for securing the electric insulation and the waterproofing property of the electric wire-connecting portion 1.

SUMMARY OF THE INVENTION

A first object of the present invention is to solve the above-described possibility. Further, a second object of the present invention is to provide a method of sealing an electric wire-connecting portion to secure electric insulation and waterproofing property thereof. Furthermore, a third object of the present invention is to provide a tube holding tool which perfectly prevents the heat shrinkable tube from vibrating, slipping off, and the hot melt adhesive from flowing out during heat treatment of the heat shrinkable tube. Furthermore, a fourth object of the present invention is to provide a tube shrinking machine for subjecting a heat shrinkable tube covering the electric wire-connecting portion to the heat treatment in the sealing method and by using the tube holding tool.

To achieve the above objects, according the first aspect of the present invention, there is provided a method of sealing an electric wire-connecting portion, comprising steps of: providing a plurality of electric wires, a heat shrinkable tube, hot melt adhesive, and a tube holding tool for protecting one end of the heat shrinkable tube against heat; forming an electric wire-connecting portion by connecting together conductive ends of the electric wires; sealing the one end of the heat shrinkable tube with the hot melt adhesive; attaching the heat shrinkable tube onto the electric wire-connecting portion; attaching the tube holding tool to the one end of the heat shrinkable tube; and heating the heat shrinkable tube to shrink it. Thus, the tube holding tool is attached to the one end of the heat shrinkable tube. Accordingly, when the heat shrinkable tube is heated, there is no chance in that the heat shrinkable tube vibrates and slips off the electric wire-connecting portion, and the hot melt adhesive melts to flow out of the one end of the heat shrinkable tube.

Further, the electric wire-connecting portion can easily be hermetically sealed in a simple manner that the electric wire-connecting portion is covered with the heat shrinkable tube, the tube holding tool is attached to the tube, and the tube is heated. The electrically insulation and the waterproofing property of the electric wire-connecting portion are secured.

According to the second aspect of the present invention, the above method of the first aspect may further comprises a step of bundling the conductive ends of the electric wires.

According to the third aspect of the present invention, the above method of the first aspect may further comprises a step of subjecting an end portion of the electric wire-connecting portion to thermal press fitting.

According to the fourth aspect of the present invention, the above method of the first aspect may further comprises a step of applying an adhesive to the electric wire-connecting portion.

According to the fifth aspect of the present invention, the above method of the first aspect may further comprises a step of cooling the heat shrinkable tube so that the hot melt adhesive is solidified.

According to the sixth aspect of the present invention, in the above method of the first aspect, the electric wire-connecting portion is hermetically sealed with the heat shrinkable tube in the heating step.

Further, to achieve the above objects, according the seventh aspect of the present invention, there is provided a tool for holding a heat shrinkable tube of which one end portion is sealed with hot melt adhesive and the other end portion receives an electric wire-connecting portion formed by connecting together conductive ends of electric wires and covers the electric wire-connecting portion, the tool comprising: a holding portion with which the one end portion of the heat shrinkable tube is held; and a shaft portion integrally formed with the holding portion.

One end of the heat shrinkable tube is capped with the holding portion of the tube holding tool. Therefore, the sealed end of the heat shrinkable tube is protected against the heat during the heating process, and hence there is no chance in that the hot melt adhesive flows out of the sealed end of the heat shrinkable tube.

If the holding portion of the tube holding tool is applied to the sealed end of the heat shrinkable tube and the shaft portion thereof is held, the heat shrinkable tube neither vibrates or slips off the sealed end of the heat shrinkable tube.

According to the eighth aspect of the present invention, in the tool of the seventh aspect, the holding portion and the shaft portion are preferably made of a metallic material.

According to the ninth aspect of the present invention, in the tool of the eighth aspect, the metallic material is preferably aluminum.

According to the tenth aspect of the present invention, in the tool of the seventh aspect, the holding portion preferably has a hollow cylindrical shape having a bottom.

Furthermore, to achieve the above objects, according the eleventh aspect of the present invention, there is provided a tube shrinking machine for shrinking a heat shrinkable tube of which one end portion is sealed with hot melt adhesive and held with a tube holding tool and the other end portion receives an electric wire-connecting portion formed by bundling a plurality of electric wires and connecting together conductive ends of the electric wires and covers the electric wire-connecting portion, the tube shrinking machine comprising: a heater section heating the heat shrinkable tube to shrink the heat shrinkable tube; a wire transporting section located outside the heater section, the wire transporting section transporting the bundled portion of the electric wires; and a tool transporting section located outside the heater section, the tool transporting section transporting the tube holding tool.

The tube shrinking machine includes the tool transporting section for transporting the tube holding tool coupled to the sealed end of the heat shrinkable tube. With the tool transporting section, the heat shrinkable tube neither vibrates or slips off the sealed end of the heat shrinkable tube during the transportation of the heat shrinkable tube for its heating by the tube shrinking machine.

According to the twelfth aspect of the present invention, the tube shrinking machine of the eleventh aspect may further comprises a machine body, wherein a space is formed in the machine body, and wherein the wire transporting section and the tool transporting section are arranged in the space.

According to the thirteenth aspect of the present invention, in the tube shrinking machine of the twelfth aspect, the heater section preferably includes heater groups which are disposed to sandwich the space.

According to the fourteenth aspect of the present invention, in the tube shrinking machine of the eleventh aspect, the wire transporting section is preferably arranged substantially in parallel with the tool transporting section.

DETAILED DESCRIPTION OF THE PREFERRED EMBODIMENTS

The preferred embodiments of the present invention will be described with reference to FIGS. 1 to 8.

Figure 1:
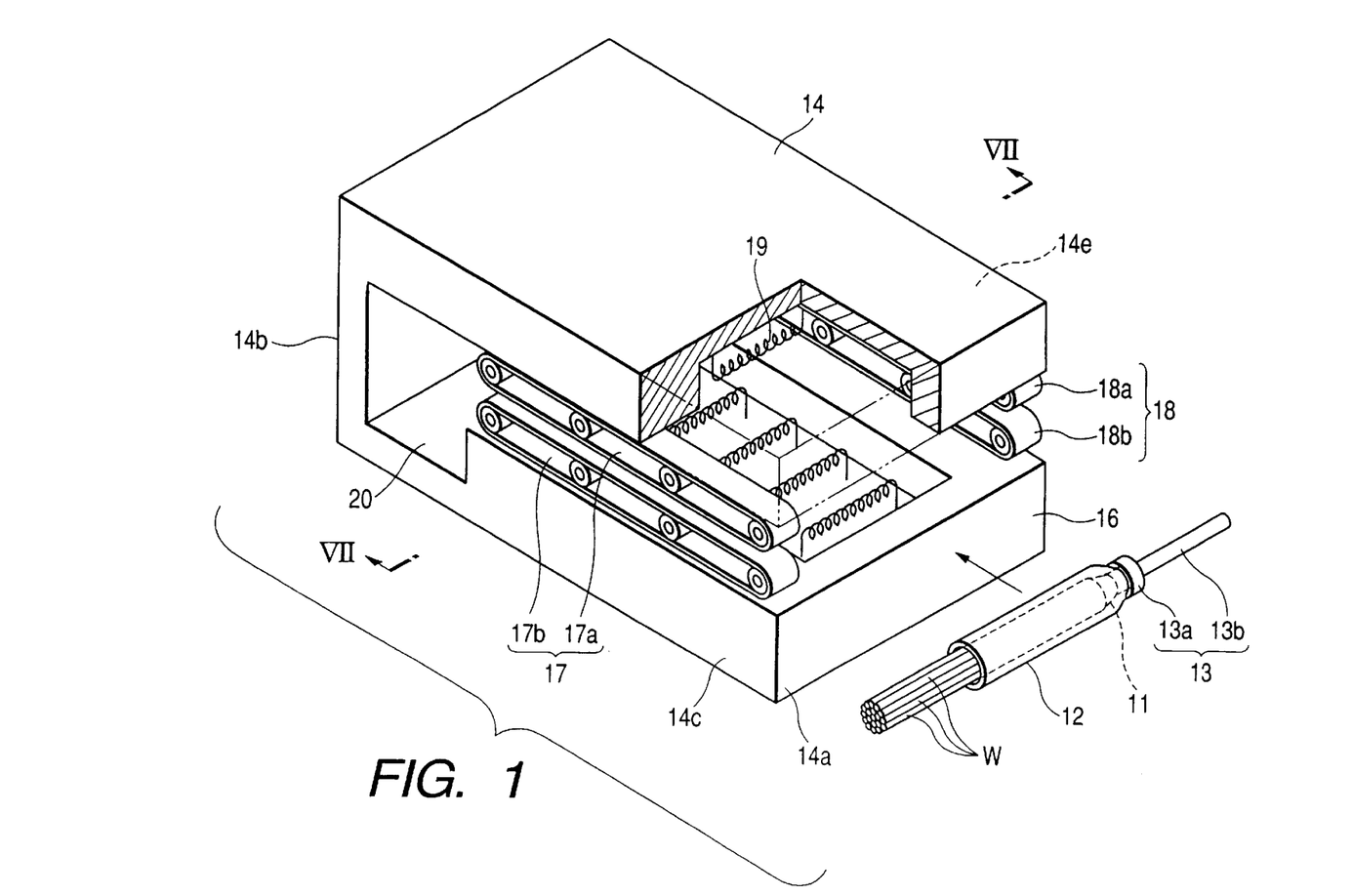
FIG. 1 is a perspective view showing an embodiment of a tube shrinking machine, and an embodiment of a tube holding tool attached to an electric wire-connecting portion covered with a heat shrinkable tube, according to the present invention.

In FIG. 1, conductive ends of a plurality of electric wires W are bundled and connected together to form an electric wire-connecting portion 11. The electric wire-connecting portion 11 and a bundle portion of the electric wires W adjacent to the electric wire-connecting portion 11 are covered with a heat shrinkable tube 12. A tube holding tool 13 is attached onto one end of the heat shrinkable tube 12 and such the assembled member is inserted into a tube shrinking machine 14. The tube shrinking machine 14 heats the heat shrinkable tube 12, and accordingly, the heat shrinkable tube per se shrinks to hermetically seal the electric wire-connecting portion 11. As a result, electrical insulation and waterproofing property of the electric wire-connecting portion 11 is secured.

The electric wire-connecting portion 11 is subjected to thermal press fitting so that an end portion 11a is formed. Incidentally, the electric wire-connecting portion 11 may be subjected to bonding treatment in which an adhesive (e.g., such instantaneous adhesive as ARON ALPHA or VISTITE, both trade name) is penetrated into or is applied onto the electric wire-connecting portion 11 so as to secure its waterproofing property.

Figure 2:
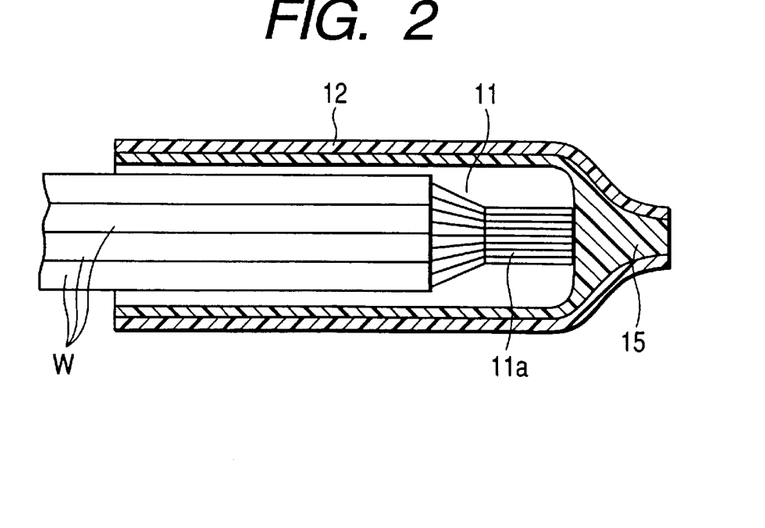
FIG. 2 is a cross sectional view showing the electric wire-connecting portion with the heat shrinkable tube of FIG. 1.

The heat shrinkable tube 12 is made of a heat shrinkable synthetic resin material such as radiation crosslinkable polyolefin. A hot melt adhesive 15 is applied onto an inner wall of the heat shrinkable tube 12 to form a layer. One end of the heat shrinkable tube 12 is sealed with the hot melt adhesive 15.

The hot melt adhesive 15 is made of an ethylene-vinyl acetate copolymer generally abbreviated to "EVA" wherein the ethylene content is 60 to 80% by weight based on the weight of the copolymer and the vinyl acetate content is 40 to 20% by weight based on the weight of the copolymer. The copolymer used for the hot melt adhesive 15 melts at 100° C. or higher. The material of the hot melt adhesive 15 is not limited to the ethylene-vinyl acetate copolymer. For example, the comonomer to be copolymerized with the ethylene monomer may be ethyl acrylate, acrylic acid or methacrylic acid other than vinyl acetate.

Figure 3:
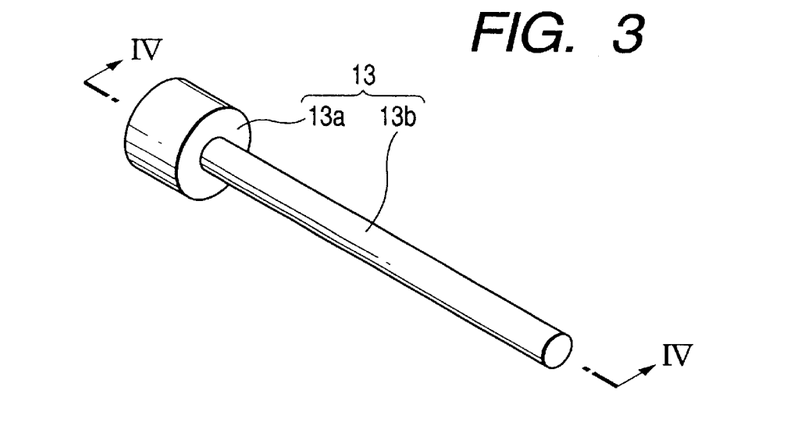
FIG. 3 is a perspective view showing the tube holding tool of FIG. 1.
Figure 4:
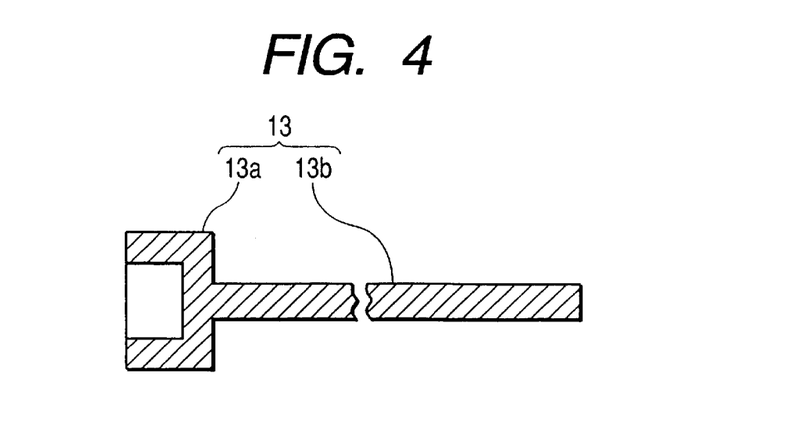
FIG. 4 is a longitudinal sectional view taken along a line IV—IV in FIG. 3.
Figure 5:
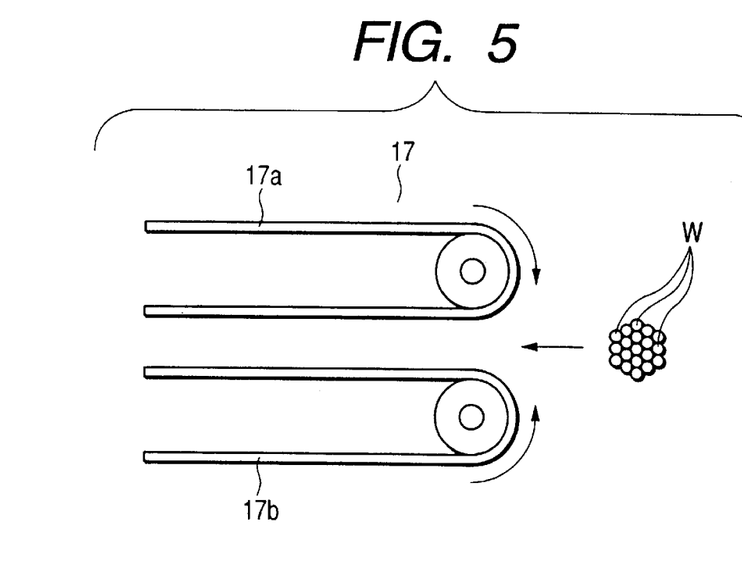
FIG. 5 is an enlarged view showing a part of a wire transporting section of the tube shrinking machine of FIG. 1.

As shown in FIGS. 3 and 4, the tube holding tool 13 is made of a metallic material such as aluminum for good heat radiation. The tube holding tool 13 includes a holding portion 13a with which the heat shrinkable tube 12 is held, and a shaft portion 13b integrally formed with the holding portion 13a. The holding portion 13a is formed into a cylindrical shape, and has a bottom. The inside diameter of the holding portion 13a is selected so as to receive the sealed end of the heat shrinkable tube 12. The shaft portion 13b is a cylindrical bar which has a length enough to be sandwiched by a tool transporting section 18 (described later) of the tube shrinking machine 14.

A construction of the tube shrinking machine 14 will be described with reference to FIG. 1. A first space 16 and a second space 20 are formed in the body of the tube shrinking machine 14 in a slit-like manner to communicate with each other. The combination of the first space 16 and the second space 20 extends from a front end 14a to that portion close to a rear end 14b. The electric wire-connecting portion 11 covered with the heat shrinkable tube 12 is inserted into the front opening of the first space 16. Within the first space 16, a wire transporting section 17 is disposed close to the first space 16 at one side portion 14c, and a tool transporting section 18 is disposed close to the first space 16 at the other side portion 14e. Upper and lower heater groups 19 are provided inside the tube shrinking machine 14 so as to sandwich the first space 16. The heater groups 19 heats the heat shrinkable tube 12 covering the electric wire-connecting portion 11 to shrink, when it is transported therebetween.

The wire transporting section 17 includes a pair of transport belts 17a and 17b which are apart from each other such that they can hold the bundled portion of the electric wires W therebetween. The transport belts 17a and 17b respectively extend along the first space 16 at the one side portion 14c from the front end 14a toward the rear end 14b. The tool transporting section 18 includes a pair of transport belts 18a and 18b which are apart from each other such that they can hold the shaft portion 13b of the tube holding tool 13 therebetween. The transport belts 18a and 18b respectively extend along the first space 16 at the other side portion 14e from the front end 14a toward the rear end 14b.

The wire transporting section 17 and the tool transporting section 18 are driven by motors (not shown), respectively. For example, the transport belts 17a and 17b are moved to transport the bundled portion of the electric wires W in a direction of an arrow shown in FIG. 5.

Incidentally, the second space 20 is for receiving the heat shrinkable tube 12 which has been heated by the heater groups 19, and cooling the same.

A process in which the heat shrinkable tube 12 covering the electric wire-connecting portion 11 is hermetically sealed by heating will be described.

A heat shrinkable tube 12 having such an inner diameter as to receive a bundled portion of electric wires W is prepared. Then, the heat shrinkable tube 12 is cut into suitable length in view of a length of the electric wire-connecting portion 11 and a desired length of the bundled portion of the electric wires W close to the electric wire-connecting portion 11. Afterwards, one end of the heat shrinkable tube 12 is filled with the hot melt adhesive 15, and further, the hot melt adhesive 15 is applied onto an inner surface of the heat shrinkable tube 12 to form a layer. Then, the heat shrinkable tube 12 is attached onto the electric wire-connecting portion 11.

Figure 6:
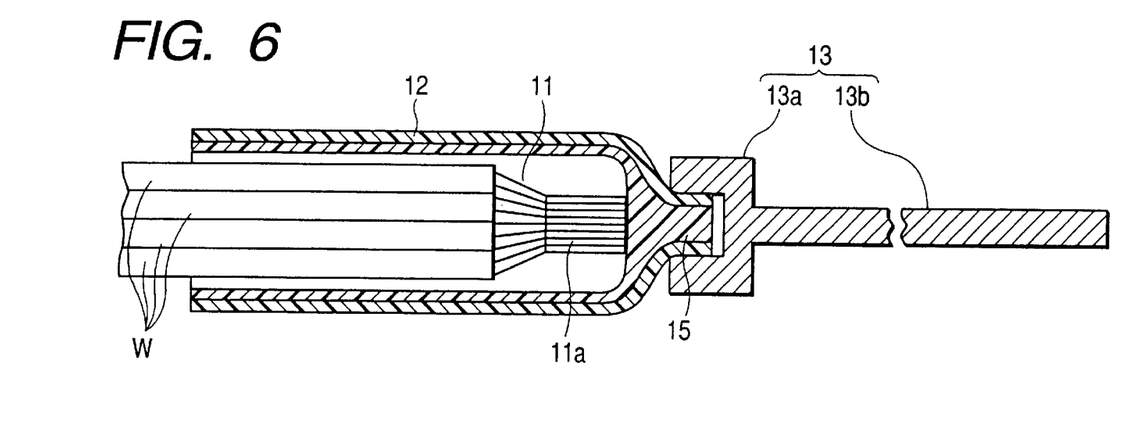
FIG. 6 is a longitudinal sectional view showing the tube holding tool of FIG. 3 attached to the heat shrinkable tube covering the electric wire-connecting portion.

As shown in FIG. 6, the holding portion 13a of the tube holding tool 13 is fitted to the end of the heat shrinkable tube 12 which is sealed with the hot melt adhesive 15.

As shown in FIG. 1, the electric wire-connecting portion 11 with the heat shrinkable tube 12 and the tube holding tool 13 is inserted into the tube shrinking machine 14 in the direction indicated by the arrow.

Figure 7:
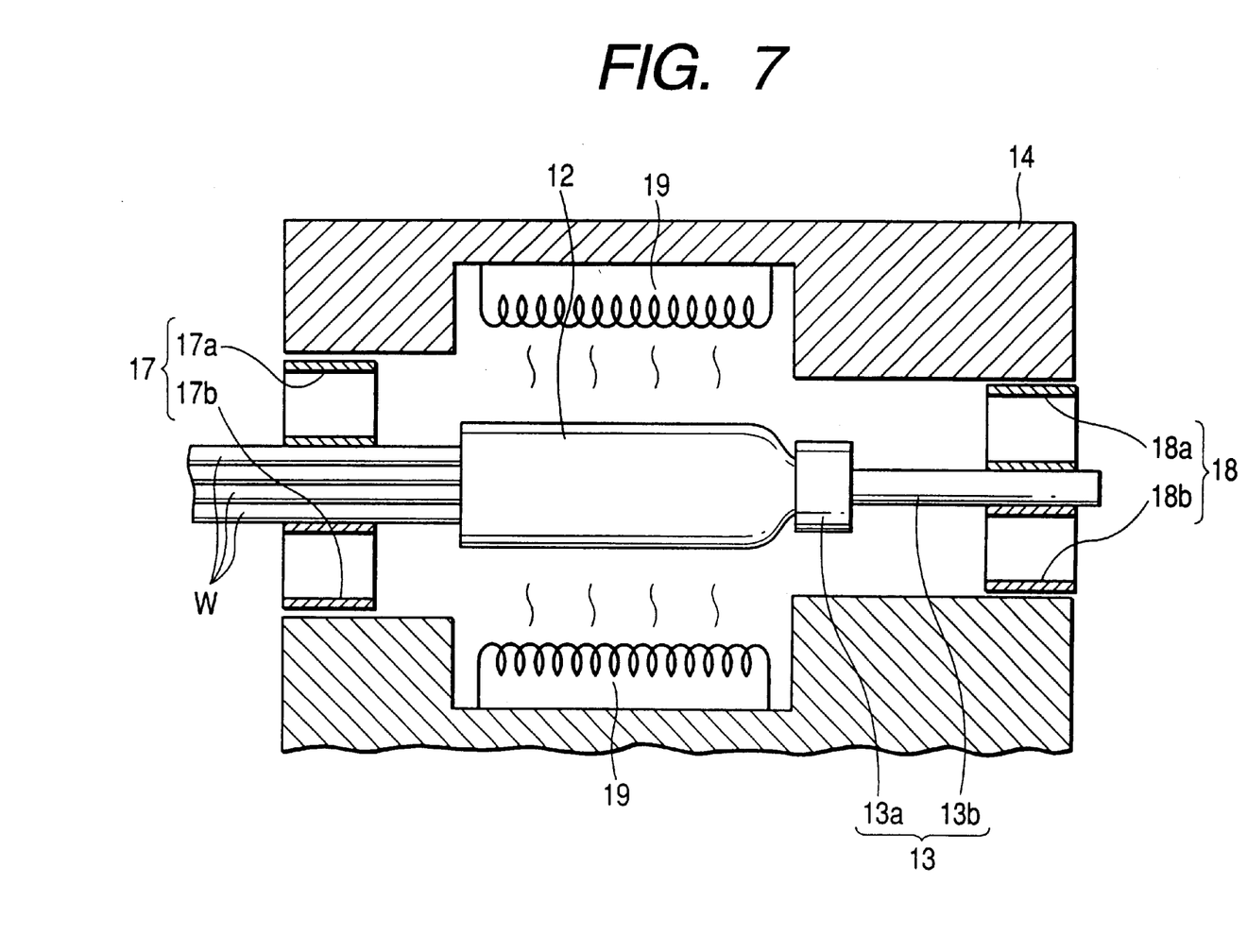
FIG. 7 is a cross sectional view showing the tube shrinking machine taken along a line VII—VII in FIG. 1.

The shaft portion 13b of the tube holding tool 13 is held and transported by the tool transporting section 18 as the bundled portion of the electric wires W is held and transported by the wire transporting section 17. Then, as shown in FIG. 7, the heat shrinkable tube 12 is heated by the heater groups 19 to shrink and hermetically fit onto the electric wire-connecting portion 11 while the heat shrinkable tube 12 passes through the heater groups 19.

Figure 8:
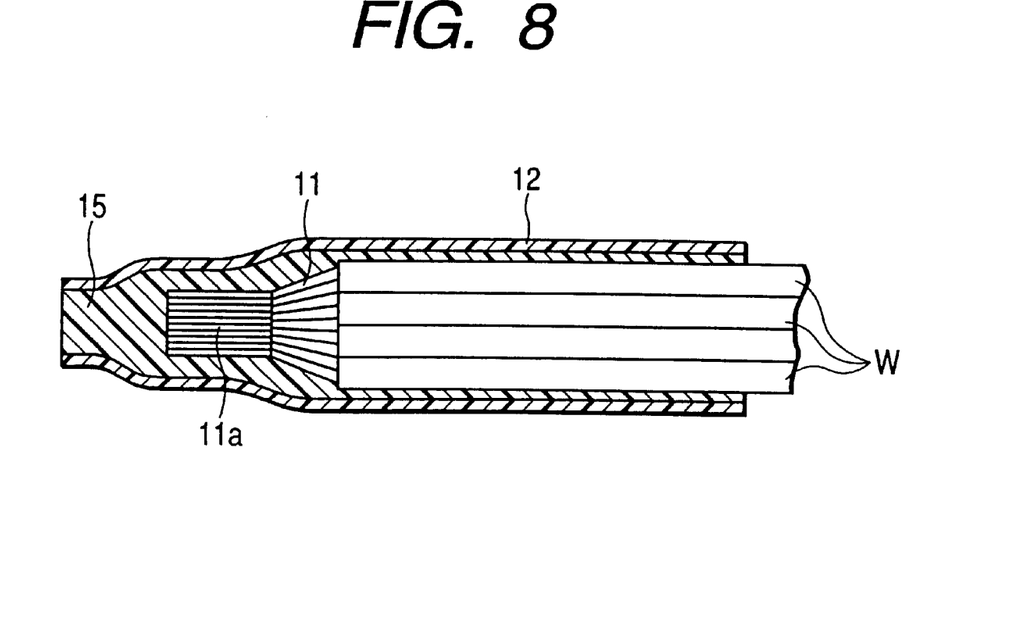
FIG. 8 is a cross sectional view showing a state that the heat shrinkable tube hermetically seals the electric wire-connecting portion after it is heated.

Under the heating, the hot melt adhesive 15 forming the layer on the inner surface of the heat shrinkable tube 12 melts to fully penetrate gaps between the heat shrinkable tube 12 and the electric wire-connecting portion 11 and at the others (see FIG. 8). As a result, the electric insulation and the waterproofing property of the electric wire-connecting portion 11 are secured.

The heat shrinkable tube 12, after passing through the heater groups 19, is put into the second space 20 (see FIG. 1) and is cooled. Afterwards, the tube holding tool 13 is removed from the heat shrinkable tube 12. Thus, a series of the processes is completed. The resultant electric wire-connecting portion 11 is firmly and hermetically sealed with the heat shrinkable tube 12.

As described above, one end of the heat shrinkable tube 12 is sealed with the hot melt adhesive 15, the electric wire-connecting portion 11 is covered with the heat shrinkable tube 12, and the one end of the heat shrinkable tube 12 is capped with the holding portion 13a of the tube holding tool 13. Therefore, the one end of the heat shrinkable tube 12 is protected against the heat during the heating process, and hence there is no chance in that the hot melt adhesive 15 flows out of the one end of the heat shrinkable tube 12.

Since the tube holding tool 13 is attached onto the one end of the heat shrinkable tube 12 and the shaft portion 13b is held by the tool transporting section 18, the heat shrinkable tube 12 does not vibrate and slip off from the electric wire-connecting portion 11.

The tube shrinking machine 14 includes the tool transporting section 18 for transporting the tube holding tool 13 coupled to the one end of the heat shrinkable tube 12. In accordance with the tool transporting section 18, the heat shrinkable tube 12 does not vibrate and slip off from the electric wire-connecting portion 11 during the transportation of the heat shrinkable tube 12 for the heating.

What is claimed is:

1. A system for holding a heat shrinkable tube during a heat shrinking operation, comprising:
    a heat shrinkable tube with two end portions, wherein:
        one end portion is sealed with hot melt adhesive; and
        the other end portion receives an electric wire-connecting portion formed by connecting together conductive ends of electric wires and covers the electric wire-connecting portion, and
    a tool for holding the heat shrinkable tube comprising:
        a holding portion having a cavity in which the one end portion of the heat shrinkable tube is received, said cavity being dimensioned to hold said one end portion therein during an operation of heat shrinking the heat shrinkable tube; and
        a shaft portion integrally formed with the holding portion, said shaft portion being held during said heat shrinking operation.
2. The system of claim 1, wherein the holding portion and the shaft portion are made of a metallic material.
3. The system of claim 2, wherein the metallic material is aluminum.
4. The system of claim 1, wherein the holding portion has a hollow cylindrical shape having a bottom.

* * * * *